(12) United States Patent
Lu et al.

(10) Patent No.: US 8,922,492 B2
(45) Date of Patent: Dec. 30, 2014

(54) DEVICE AND METHOD OF INPUTTING CHARACTERS

(75) Inventors: Chengjia Lu, Shanghai (CN); Leiping Zhu, Shanghai (CN)

(73) Assignee: Sony (China) Limited, Beijing (CN)

( * ) Notice: Subject to any disclaimer, the term of this patent is extended or adjusted under 35 U.S.C. 154(b) by 1176 days.

(21) Appl. No.: 12/497,179

(22) Filed: Jul. 2, 2009

(65) Prior Publication Data

US 2010/0001958 A1    Jan. 7, 2010

(30) Foreign Application Priority Data

Jul. 4, 2008    (CN) .......................... 2008 1 0133023

(51) Int. Cl.
| | |
|---|---|
| *G06F 3/033* | (2013.01) |
| *G09G 5/08* | (2006.01) |
| *G06F 3/02* | (2006.01) |
| *G09G 5/00* | (2006.01) |
| *G06F 3/041* | (2006.01) |
| *G06F 3/048* | (2013.01) |
| *G06F 3/023* | (2006.01) |
| *G06F 3/01* | (2006.01) |

(52) U.S. Cl.
CPC .............. *G06F 3/0236* (2013.01); *G06F 3/018* (2013.01)
USPC ........... 345/169; 345/156; 345/168; 345/173; 715/773

(58) Field of Classification Search
USPC ................................................ 345/156–184
See application file for complete search history.

(56) References Cited

U.S. PATENT DOCUMENTS

| | | | | |
|---|---|---|---|---|
| 5,686,940 | A * | 11/1997 | Kuga ............................. | 345/156 |
| 5,936,556 | A * | 8/1999 | Sakita ........................... | 345/171 |
| 7,626,574 | B2 * | 12/2009 | Kim ............................... | 345/168 |
| 2001/0026274 | A1 * | 10/2001 | Saruwatari .................... | 345/467 |
| 2005/0104905 | A1 | 5/2005 | Yamamoto | |
| 2007/0052682 | A1 * | 3/2007 | Kang et al. .................... | 345/173 |
| 2009/0213134 | A1 * | 8/2009 | Stephanick et al. .......... | 345/173 |

FOREIGN PATENT DOCUMENTS

| | | |
|---|---|---|
| JP | 6-214978 | 8/1994 |
| JP | 2001-209469 | 8/2001 |
| JP | 2003-289370 | 10/2003 |
| JP | 2005-149026 | 6/2005 |

* cited by examiner

*Primary Examiner* — Ryan A Lubit
(74) *Attorney, Agent, or Firm* — Oblon, Spivak, McClelland, Maier & Neustadt, L.L.P.

(57) ABSTRACT

A method of inputting characters includes: generating a character display area, displaying characters in a first direction sub-region or a second direction sub-region of the character browsing region according to a direction indicating action in a first direction or a second direction, upon detecting a change in directions indicated by two successive direction indicating actions, displaying, in an input character display region, the character currently displayed in the character browsing region, switching between the first direction sub-region and the second direction sub-region of the character browsing region according to the direction indicated by the latter direction indicating action, and performing an action of selecting a next character corresponding to the latter direction indicating action in the switched direction sub-region. The invention also provides a device of inputting characters. With the invention, the number of times key pressing may be reduced and the efficiency of character inputting may be increased.

20 Claims, 10 Drawing Sheets

DEVICE AND METHOD OF INPUTTING CHARACTERS

This application claims priority to Chinese Patent Application No. 200810133023.4, filed with the Chinese Patent Office on Jul. 4, 2008 and entitled "Device and Method of Inputting Characters", the contents of which are incorporated herein by reference in its entirety.

FIELD OF THE INVENTION

The invention relates to character processing techniques, and in particular, to a device and method of inputting characters.

BACKGROUND OF THE INVENTION

With the rapid development of electronics and communication technologies, mobile application devices, such as cell phone, personal digital assistant, video and audio player (e.g. MP3 or MP4), and hand-held game machine (e.g. the PSP series presented by Sony), with their advantages of light weights and portability, are enjoying general popularity. To expand the size of visual interfaces of mobile application devices, the display screens configured in the mobile application devices are made larger in size. However, the sizes of the mobile application devices themselves limit the expansion of the visual interfaces. In view of this, many existing mobile application devices are provided with only, for example, a four-way control key, while the physical keypad or physical keys are removed, so as to expand the sizes of the display screens. To compensate for the missing of the physical keypad or keys, a virtual keypad or virtual keys may be provided on the display screen.

In addition, online interaction function is becoming a renovation point in the industry of household electronic devices, such as conventional television, home digital player, and digital album. The basic online applications, such as searching, chatting, and web address inputting, are presenting a challenge to the household inputting device that is generally a remote controller at present. Similarly a virtual keypad or virtual keys may be provided on the screen of a household electronic device.

FIG. 1a is a schematic diagram illustrating an interface which displays virtual numerical keys on a display screen according to the existing technologies. As shown in FIG. 1a, the virtual numerical keys include dial keys corresponding to the numbers 1, 2, 3, . . . , 9, and 0, respectively, and a few functional keys. Generally each dial key may correspond to three letters, and the numbers of times of pressing the dial key may determine which one of the three letters should be input. For example, the letter "s" is input if the numerical key "7" is pressed four times. With the method, the inputting of a Chinese character by entering the letters contained in the Chinese phonetic transcription (Pinyin) of the Chinese character becomes very troublesome. The inputting speed depends not only upon the numbers of the letters contained in the Chinese phonetic transcription of each Chinese character and the positions of the letters among the keys. Further, since the keys are virtual keys displayed on the screen, the inputting of characters inevitably involves the switching between the keys that requires the combined usage of a four-way key and a confirming key. For example, if the characters "SONY" are to be inputted by using the above key inputting method, the number of times of pressing the four-way control key and the confirming key will reach 18. Therefore, the inputting method is not only time consuming and laborious, but also inefficient. Moreover, the frequent pressing of the keys may bring about a structural impair to the keys. In addition, the small size of a terminal device, such as a cell phone, inconveniences the operation of the fingers of a user, thereby resulting in the operation fatigue of the user and even some ailments in his/her finger articulations.

FIG. 1b is a schematic diagram illustrating an interface which displays a virtual QWERTY keypad on a display screen according to the existing technologies. As shown in FIG. 1b, the virtual QWERTY keypad is provided with numerical keys 1, 2, 3, . . . , 9, and 0, letter keys A-Z, and symbol keys for other special symbols. As shown in FIG. 1b, a character may be inputted by pressing the confirming key and the key corresponding to the character. However, the virtual keypad requires a four-way control key to enable the switching between the keys. For example, the switching from the letter "A" to the letter "N" needs two pressing actions, i.e. the pressing of the "Right (Left)" key and the pressing of the "Up (Down)" key. Then the letter "N" may be inputted by pressing the confirming key. Taking the inputting of characters "SONY" as an example again, by using the character inputting method as shown in FIG. 1b, the number of times of pressing the keys (including the four-way control key and the confirming key) may be reduced to 11. However, such a method still can not meet the requirements of fast character inputting.

A US patent application, the publication Number of which is 20010026274 A1, discloses an information processing device, a character input method, and computer-readable storage medium storing a program for causing the computer to execute the method. As shown in FIG. 2, the information processing device includes a display screen 102, a four-way controller 106 (including a confirming key), a character type select key 107 and a clear key 108. The display screen 102 consists of an input character display unit 103, a row display unit 104, and a character display unit 105. The device is characterized in that all the possible characters are divided into a plurality of character groups (such as "A", "Ka", "Sa", "Ta", "Na", . . . , "Ra", "Wa"), each character group includes a plurality of characters (for example, the character group "Ta" includes "Ta", "Ti", "Tu", "Te", and "To"). Any character may be selected and input by pressing the four-way controller 106. Compared with the previously described methods, the method can reduce the number of times of pressing the keys, thereby increasing the efficiency of character inputting.

In the above described patent application, however, the row display unit 104 displays a plurality of character groups and the character display unit 105 displays a plurality of characters in a selected character group. When selecting a character, an operator has to move the curser to the character group containing the character in the row display unit 104 (by using the "Left" and "Right" keys), and then move the cursor to the character to be selected in the plurality of characters displayed in the character display unit 105 (by using the "Up" and "Down" keys), and finally press the confirming key of the four-way controller 106 to confirm the character so that the character is displayed on the input character display unit 103. This inputting process is also rather troublesome. Particularly, the above mentioned steps have to be repeated in the case of an input error or in the case of re-inputting for amendments. Therefore, the efficiency of character inputting in this method also needs improvement.

SUMMARY OF THE INVENTION

Some embodiments of the invention provide a device and a method of inputting characters, by which the number of times of pressing keys when inputting a character may be reduced.

An embodiment of the invention provides a device of inputting characters. The device of inputting characters may include: a character storage unit for storing character information; a display unit; a direction indicating unit for performing direction indicating actions in a first direction and a second direction; a detecting unit for detecting a direction indicating action in the direction indicating unit; a display area generating unit for generating a character display area through the display unit, the character display area including a character browsing region and an input character display region; the character browsing region including a first direction sub-region corresponding to the first direction indicating action and a second direction sub-region corresponding to the second direction indicating action, for displaying characters according to the direction indicating actions; a decision unit for making a decision of displaying a character or confirming the current character as an input character according to the direction indicating action in the direction indicating unit detected by the detecting unit; wherein the action of making a decision includes: upon detecting a change in the directions indicated by two successive direction indicating actions between the first direction and the second direction, displaying, in the input character display region, the current character displayed in the character browsing region, switching between the first direction sub-region and the second direction sub-region of the character browsing region according to the direction indicated by the latter direction indicating action, and performing an action for selecting a next character corresponding to the latter direction indicating action in the switched direction sub-region.

Optionally, the device for inputting characters may further include: a confirming unit for confirming the current character displayed in the character browsing region so as to display the character as an input character in the input character display region.

Optionally, the device for inputting characters may further include: a draw-back unit for canceling one or more input characters currently displayed in the input character display region, and causing the character browsing region to return to the initial state.

Optionally, the device for inputting characters may further include: a character type switching unit for switching between character types so that the character display area displays characters of the switched type.

Optionally, in response to a character type of Chinese character, the input character display region may further include a phonetic transcription/Chinese character inputting area and a Chinese character selecting area, the Chinese character selecting area is capable of displaying one or more candidate Chinese characters corresponding to an input phonetic transcription and candidate phrases corresponding to the candidate Chinese characters, and displaying characters according to the direction indicating actions, and is capable of displaying the current character in the phonetic transcription/Chinese character inputting area according to the change of directions indicated by the two successive direction indicating actions.

Optionally, in response to a character type of Chinese character, the character inputting may include a basic phonetic input mode or a fast phonetic input mode, the basic phonetic input mode includes one-by-one inputting of respective characters forming a phonetic transcription, the fast phonetic input mode includes inputting of the combination of a first phonetic element and a second phonetic element, wherein the first phonetic element is an initial consonant, the second phonetic element is a vowel, and the first phonetic element and the second phonetic element correspond to the first direction sub-region and the second direction sub-region of the character browsing region respectively.

Optionally, the characters in the character browsing region may be displayed in a circularly scrolling manner. Particularly, the first direction sub-region and the second direction sub-region of the character browsing region may be scrolled in synchronization with each other.

Optionally, the direction indicating unit may be a four-way navigation key, stick, click wheel, track ball, click scrollbar, or other devices having a function of to indicating directions.

Another embodiment of the invention provides a method of inputting characters. The method of inputting characters may include: a step of generating a character display area, the character display area including a character browsing region and an input character display region, the character browsing region including a first direction sub-region and a second direction sub-region; a step of displaying characters in a first direction sub-region or a second direction sub-region of the character browsing region according to a direction indicating action in a first direction or a second direction; a step of making a decision of displaying a character or confirming the current character as an input character according to a direction indicating action as detected; wherein the step of making a decision includes: upon detecting a change in the directions indicated by two successive direction indicating actions between the first direction and the second direction, displaying, in the input character display region, the current character displayed in the character browsing region, switching between the first direction sub-region and the second direction sub-region of the character browsing region according to the direction indicated by the latter direction indicating action, and performing an action for selecting the next character corresponding to the latter direction indicating action in the switched direction sub-region.

Optionally, the method for inputting characters may further include: a step of confirming the current character displayed in the character browsing region so as to display the character as an input character in the input character display region, to complete the operation of character inputting.

Optionally, the method for inputting characters may further include: a step of canceling one or more input characters currently displayed in the input character display region, and causing the character browsing region to return to the initial state.

Optionally, the method for inputting characters may further include: a step of, in response to the character information of more than one character types, switching between character types so that the character display area displays characters of the switched type.

Optionally, in response to a character type of Chinese character, the input character display region may further include a phonetic transcription/Chinese character inputting area and a Chinese character selecting area, the Chinese character selecting area is capable of displaying one or more candidate Chinese characters corresponding to an input phonetic transcription and candidate phrases corresponding to the candidate Chinese characters, and displaying characters according to the direction indicating actions, and is capable of displaying the current character in the phonetic transcription/Chinese character inputting area according to the change of directions indicated by the two successive direction indicating actions.

Optionally, in response to a character type of Chinese character, the character inputting may include a basic phonetic input mode or a fast phonetic input mode, the basic phonetic input mode including one-by-one inputting of respective characters forming a phonetic transcription, the fast phonetic input mode including inputting of the combination of a first phonetic element and a second phonetic element. The first phonetic element is an initial consonant, the second phonetic element is a vowel, and the first phonetic element and the second phonetic element correspond to the first direction sub-region and the second direction sub-region of the character browsing region respectively.

Optionally, the characters in the character browsing region may be displayed in a circularly scrolling manner. Particularly, the first direction sub-region and the second direction sub-region of the character browsing region may be scrolled in synchronization with each other.

Compared with the existing technologies, in the device and method of inputting characters according to the embodiments of the invention a character display area including a character browsing region is generated and the character browsing region includes a first direction sub-region and a second direction sub-region. During the process of inputting a character, when detecting a change in the directions indicated by two successive direction indicating actions, the latter direction indicating action has the function of confirming the current character indicated by the previous direction indicating action so as to complete the inputting of the current character. Further, the direction indicated by the latter direction indicating action may also be used to select the next character in the following step. The operations, which may need two or more pressing actions in the existing solutions, can be completed by one key-pressing action indicating direction change in the solutions according to the present invention. Accordingly, the number of times of pressing keys is reduced and the efficiency of character inputting is increased.

BRIEF DESCRIPTION OF THE DRAWINGS

FIG. 1a and FIG. 1b are schematic diagrams illustrating interfaces of keys in an electronic device according to the existing technologies, in which FIG. 1a is a schematic diagram illustrating an interface which displays virtual numerical keys and FIG. 1b is a schematic diagram illustrating an interface which displays a virtual QWERTY keypad;

DETAILED DESCRIPTION OF THE INVENTION

An embodiment of the invention provides a device of inputting characters. The device of inputting characters includes a character browsing region which includes a first direction sub-region and a second direction sub-region corresponding to a direction indicating unit. The first direction sub-region and the second direction sub-region are controlled according to the direction indicating actions of the direction indicating unit. In addition, when there is a change in the directions indicated by two successive direction indicating actions, the latter direction indicating action has both the function of confirming the current character indicated by the previous direction indicating action so as to complete the inputting of the current character and the function for selecting the next character. Therefore, the number of times of key pressing may be reduced, thereby increasing the efficiency of character inputting. Below is the detailed description of the invention in conjunction with the accompany drawings and some embodiments.

Figure 1A:
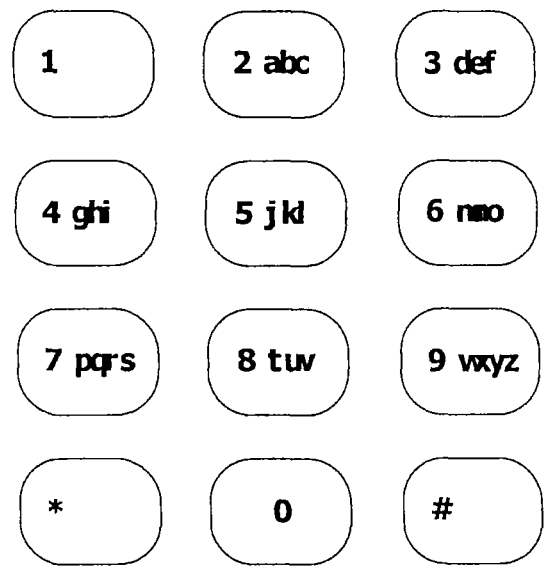
Figure 1B:
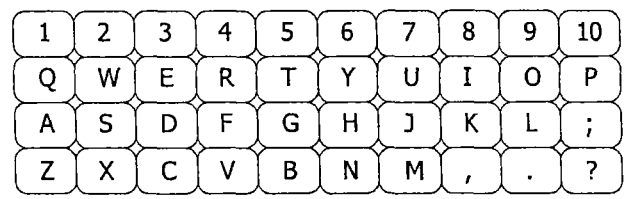
Figure 2:
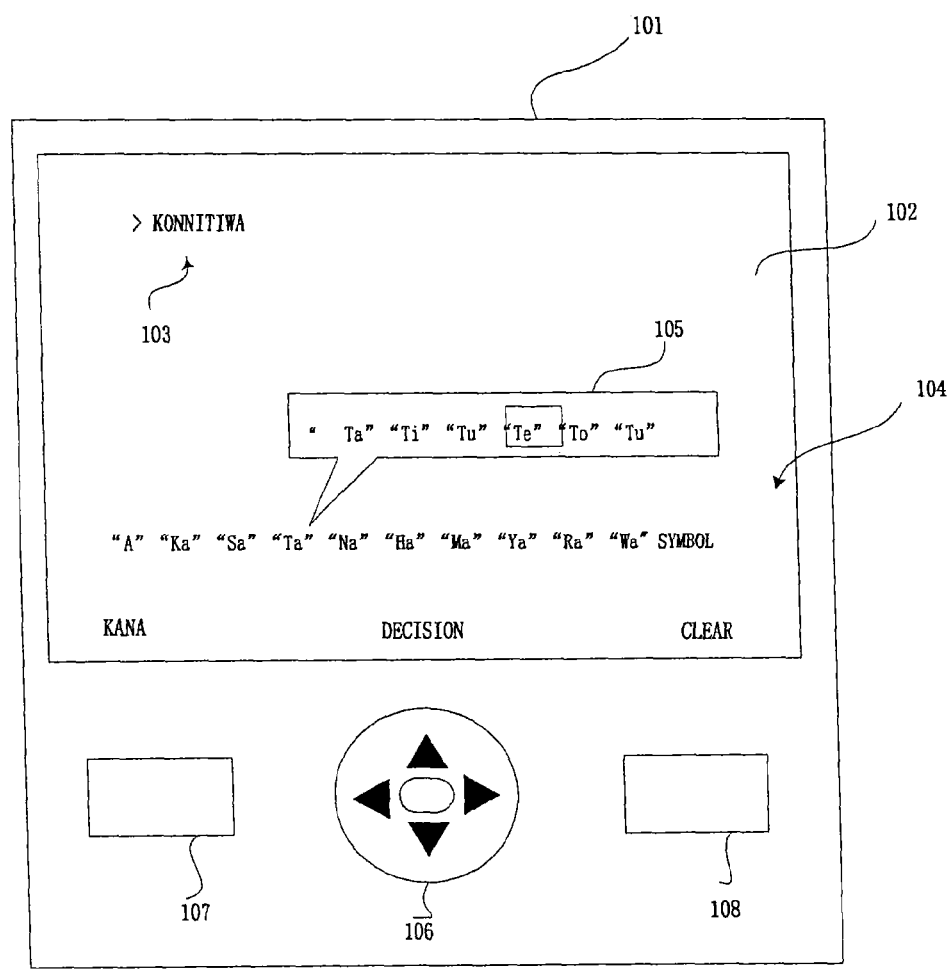
FIG. 2 is a schematic diagram illustrating the operation interface of an information processing device in a relevant patent application.
Figure 3:
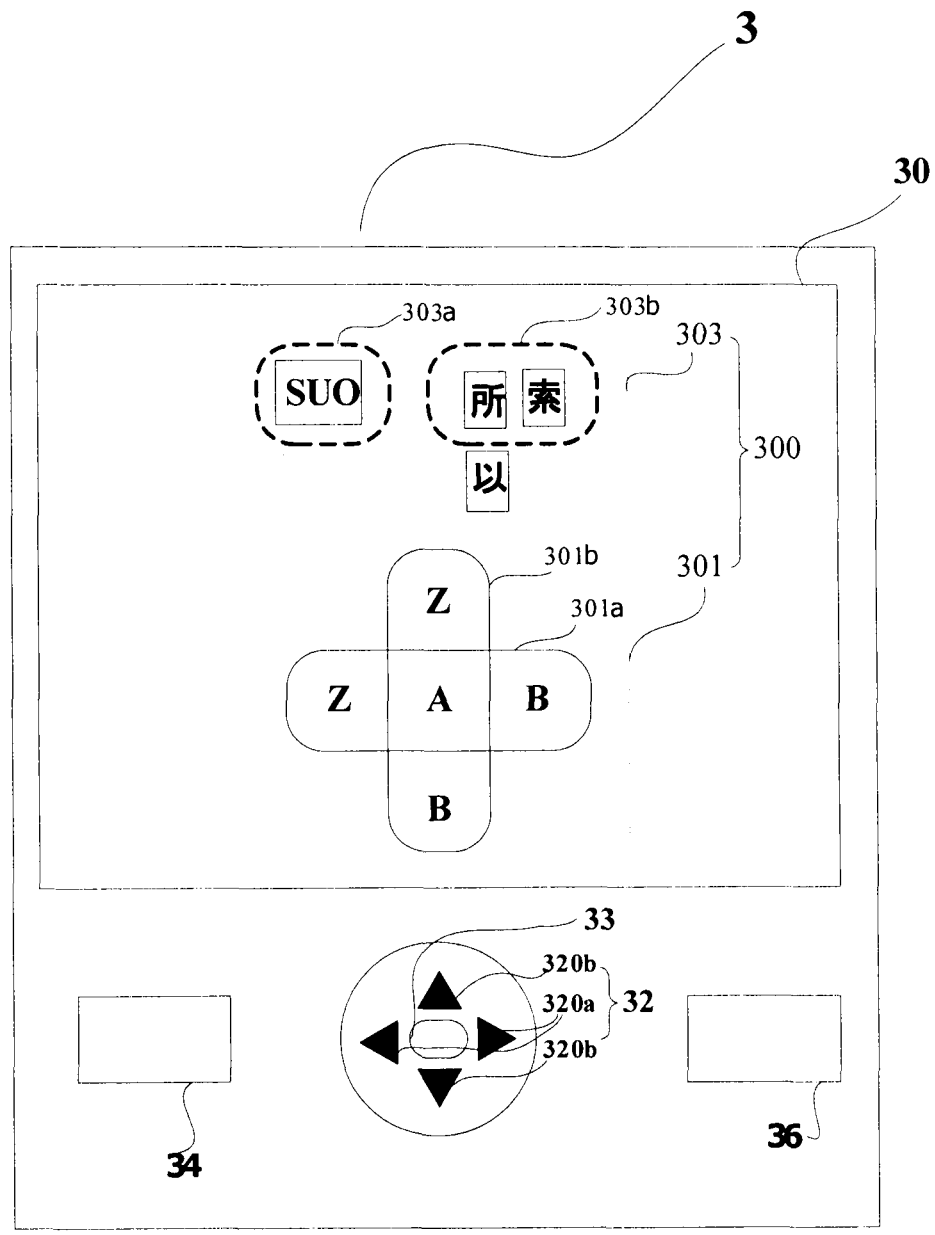
FIG. 3 is a schematic diagram illustrating an operation interface of a device of inputting characters according to an embodiment of the invention.

FIG. 3 is a schematic diagram illustrating an operation interface of a device of inputting characters according to an embodiment of the invention. In an example, the device of inputting characters may be an electronic device capable of character inputting or text processing in a cell phone, a personal digital assistance, a digital camera, a video and audio player (e.g. MP3 or MP4), a hand-held game machine (e.g. the PSP series presented by Sony), or a television, a home digital player, or an electronic album, or the like.

As shown in FIG. 3, the device 3 of inputting characters includes a display screen 30, a four-way control key 32, a confirming key 33, a draw-back key 34, and a character type switching key 36.

The display screen 30 may be a Liquid Crystal Display (LCD). A character display area 300 may be generated on the display screen 300. The character display area 300 includes a character browsing region 301 and an input character display region 303. The character browsing region 301 may display candidate characters to be browsed by a user and the input character display region 303 may display the characters that are inputted and confirmed.

The four-way control key 31 includes direction keys for moving the cursor in the directions including "Up", "Down", "Right", and "Left".

The confirming key 33 is adapted to confirm the current character displayed in the character browsing region 301 according to the direction indicating actions of the four-way control key 32 and display the character as an input character in the input character display region 303.

The draw-back key 34 is adapted to cancel one or more input characters currently displayed in the input character display region 303, and enable the character browsing region 301 to return to an initial status. The initial status refers to an initial character displaying status of the character browsing region 301 when the device of inputting characters initiates or starts to input a certain character type. The initial status may be recorded in, for example, a Read Only Memory (ROM) during the manufacturing of the device of inputting characters, or may be edited and set by the user via, for example, an editing software. Detailed description of the process may be found in the following text, and is not repeated herein.

The character type switching key 36 is adapted to switch between the character types so that the character display area displays the characters of the switched character type.

Figure 4:
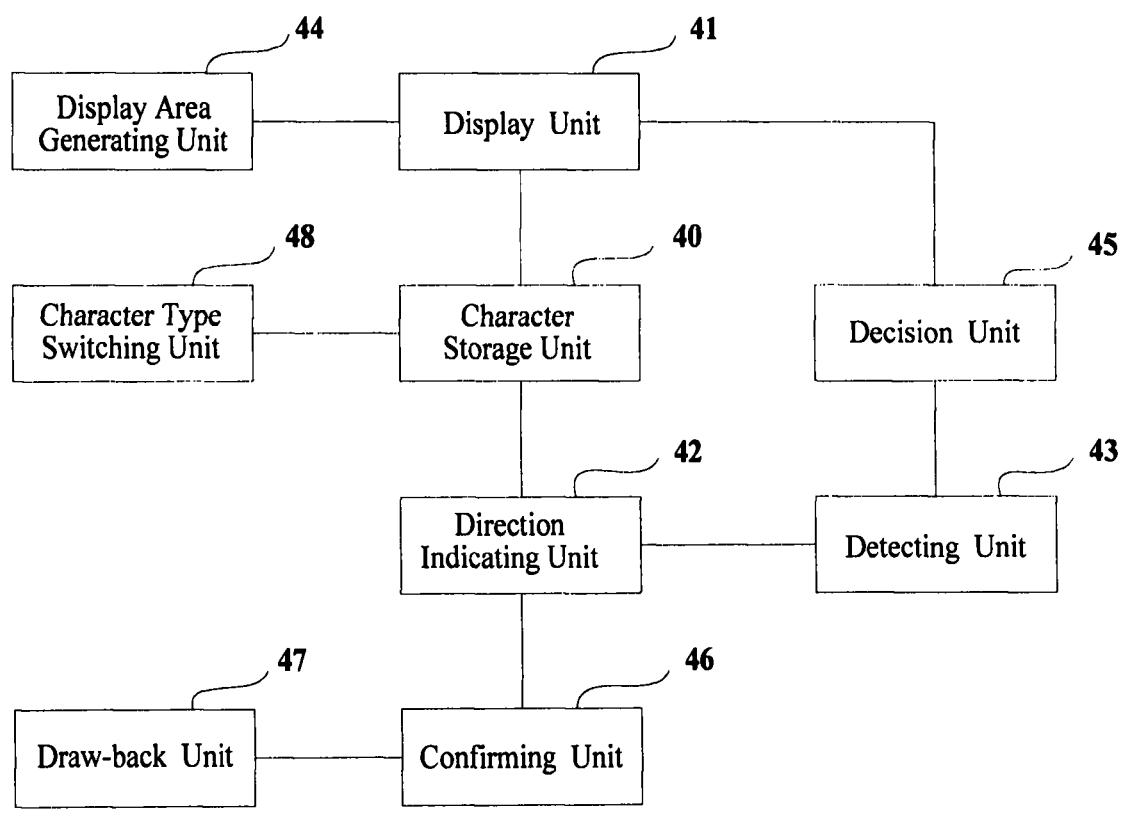
FIG. 4 is a schematic diagram illustrating a structure of a device of inputting characters according to an embodiment of the invention.

FIG. 4 is a schematic diagram illustrating the structure of a device of inputting characters according to an embodiment of the invention. As shown in FIG. 4, the device of inputting characters includes a character storage unit 40, a display unit 41, a direction indicating unit 42, a detecting unit 43, a display area generating unit 44, a decision unit 45, a confirming unit 46, a draw-back unit 47, and a character type switching unit 48.

The character storage unit 40 is adapted to store character information. The character information includes information of characters of at least one character type. When there are multiple character types, the character information may be classified into multiple types according to the character types. The character types may include English character, Chinese character, digits, or special symbols, or the like. Taking the Chinese character as an example, the character information of Chinese characters may include the phonetic letters of the Chinese phonetic transcription (Pinyin). Of course, the character information of Chinese characters is not limited to this. For example, the phonetic letters of Chinese phonetic transcription may be classified into initial consonants and vowels which, as a first phonetic element and a second phonetic element, may be combined to form two-dimension phonetic transcription information so as to form the phonetic transcriptions of all the Chinese characters. Then the phonetic transcription information is associated with all the characters in an assembled Chinese character set so that each phonetic transcription corresponds to a Chinese character corresponding to the phonetic transcription. The character information mentioned above can be managed and stored by a person of ordinary skill in the art according to the existing technologies since the management and storage are well known in the art, the description of which is omitted herein.

The display unit 41 may correspond to the display screen 30 of, for example, the LCD as shown in FIG. 3 in the embodiment.

The direction indicating unit 42 is adapted to perform the direction indicating actions in a first direction and a second direction. In the embodiment, the direction indicating unit 42 may correspond to the four-way control key 32 as shown in FIG. 3. The first direction may be the moving direction of the cursor when pressing the "Right" and "Left" direction keys 320*a* and the second direction may be the moving direction of the cursor when pressing the "Up" and "Down" direction keys 320*b*. In the embodiment, the direction indicating unit 42 is illustrated as a four-way control key. However, the direction indicating unit 42 can not be regarded as limited to this, instead it may be any appropriate device that has the function of indicating the directions including the first direction and the second direction. For example, the direction indicating unit 42 may be a stick, a click wheel, a track ball, a click scrollbar, or other appropriate device having a function of indicating directions, to replace the four-way control key 32 to implement the above described direction indicating function. In addition, any key may be configured as a direction key having the function of indicating directions through the system configuration of the device of inputting character. For example, in a digit keypad the digits 2, 4, 6, 8 may be configured as the direction keys capable of indicating the directions such as "Up", "Down", "Right", "Left", respectively.

The detecting unit 43 is adapted to detect a direction indicating action of the direction indicating unit 42. In the embodiment, when a user presses down a direction key of the four-way control key 32, a pulse signal, which carries direction indicating information, may be triggered to the detecting unit 43. The detecting unit 43 may obtain the pulse signal and record the direction indicating information. In this way, the direction indicated by the direction indicating action of the direction indicating unit 42 may be detected in real time.

The display area generating unit 44 is adapted to generate a character display area 300 through the display unit 41. The character display area 300 includes a character browsing region 301 and an input character display region 303.

The character browsing region 301 is adapted to display candidate characters to be browsed by the user. In the embodiment the character browsing region 301 is cross-shaped, and includes a first direction sub-region 301*a* and a second direction sub-region 301*b* intersected with first direction sub-region 301*a*. The position at which the first direction sub-region 301*a* intersects with the second direction sub-region 301*b* is the position of the selected current character. In the embodiment the first direction sub-region 301*a* and the second direction sub-region 301*b* of the character browsing region 301 correspond to the direction indicating actions indicating the first direction and the second direction in the direction indicating unit 42, respectively. The characters in the first direction sub-region 301*a* or the second direction sub-region 301*b* may be displayed in a circularly scrolling manner according to the direction indicating actions of the first direction or the second direction. Particularly, the characters in the first direction sub-region 301*a* and the second direction sub-region 301*b* of the character browsing region 301 may be scrolled in a synchronized manner in some cases.

The input character display region 303 is adapted to display the characters that are input and confirmed. Particularly, when the input characters are Chinese characters, the input character display region 303 may further include a phonetic transcription / Chinese character inputting area 303*a* and a Chinese character selecting area 303*b*. The Chinese character selecting area 303*b* is capable of displaying one or more candidate Chinese characters corresponding to an input phonetic transcription and candidate phrases corresponding to the candidate Chinese characters and displaying characters according to the direction indicating actions, and is further capable of displaying the current character in the phonetic transcription/Chinese character inputting area 303*a* according to the change in the directions indicated by two successive direction indicating actions.

As shown in FIG. 3, in the embodiment the first direction sub-region 301*a* and the second direction sub-region 301*b* intersect with each other so that the character browsing region 301 is cross-shaped. However, the shape of the character browsing region 301 is not limited to this. For example, the character browsing region 301 may be crescent-moon-shaped, or T-shaped, or the like. In practice, the character browsing region 301 may be of any appropriate shape so long as it has the first direction sub-region 301*a* and the second direction sub-region 301*b* characterizing the two directions. The first direction sub-region 301*a* and the second direction sub-region 301*b* are not limited to being intersected with each other. The two sub-regions can be separated from each other, for example, be parallel to each other. In addition, in the embodiment the first direction sub-region 301*a* and the second direction sub-region 301*b* may be of a bar-shaped structure. However, the shapes of the two sub-regions are not limited to this. For example, the two sub-regions may be of any other appropriate shape, for example, they may be arc shaped or ring-shaped, or even they may be of a three-dimension structure.

The decision unit 45 is adapted to make a decision of displaying a character or confirming the current character as an input character according to the direction indicating action of the direction indicating unit 42 detected by the detecting unit 43. Particularly, when the detecting unit 43 detects a direction indicating action of the direction indicating unit 42 and the current direction indicating action indicates the first direction, the decision unit 45 enables the first direction sub-region 301a of the character browsing region 301 to display the candidate characters of the character information in a scrolling manner in the first direction. When the detecting unit 43 detects a change in the directions indicated by two successive direction indicating actions, if the former direction indicating action indicates the first direction and the latter direction indicating action indicates the second direction, the decision unit 45 confirms the current character displayed in the first direction sub-region 301a of the character browsing region 301 and makes the current character to be displayed in the input character display region 303, then switches the current sub-region from the first direction sub-region 301a to the second direction sub-region 301b according to the direction indicated by the latter direction indicating action, enables the second direction sub-region 301b to display the candidate characters of the character information in a scrolling manner of the second direction, and performs an action of selecting the next character corresponding to the second direction.

The device of inputting characters according to an embodiment of the invention may further include a confirming unit 46 which is adapted to confirm the current character displayed in the character browsing region so as to display the character as an input character in the input character display region. In the embodiment, the confirming unit 46 may correspond to the confirming key 33 as shown in FIG. 3. When the required character is found via the direction indicating actions of the direction indicating unit 42, a user may press the confirming key 33 so as to confirm the current character and display the current character in the input character display region 303.

The device of inputting characters according to an embodiment of the invention may further include a draw-back unit 47 which is adapted to cancel one or more input characters currently displayed in the input character display region and cause the character browsing region to return to the initial state. In the embodiment, the draw-back unit 47 may correspond to the draw-back key 34 as shown in FIG. 3. A user may cancel the input characters by pressing the draw-back key 34. In this way, the input characters may be deleted and the input text may be modified.

The device of inputting characters according to an embodiment of the invention may further include a character type switching unit 48 which is adapted to switch between character types when there are multiple character types so that the character display area displays the characters of the switched type. In this way the user may input the characters of various character types. In the embodiment, the character type switching unit 48 may correspond to the character type switching key 36 as shown in FIG. 3. The user may switch from the current character type to another character type by pressing the character type switching key 36, the information of the switched character type may be informed to the device 3 of inputting characters so that the character storage unit 40 may extract the character information of the switched character type and the information may be displayed in the character browsing region 301 of the display unit 41. As described above, the character types may include English character, Chinese character, digits, or special symbols, or the like.

It should be noted that the character types may include English character, Chinese character, digits, or special symbols or the like. Particularly, when the character type includes Ideographic Description Characters such as Chinese character, the character inputting may include a basic phonetic input mode or a fast phonetic input mode. The basic phonetic input mode includes the one-by-one inputting of respective letters forming a phonetic transcription, and the fast phonetic input mode includes the inputting of the combination of a first phonetic element and a second phonetic element. A user may select the character type by pressing the character type switching key 36 so as to input the required characters.

Figure 5:
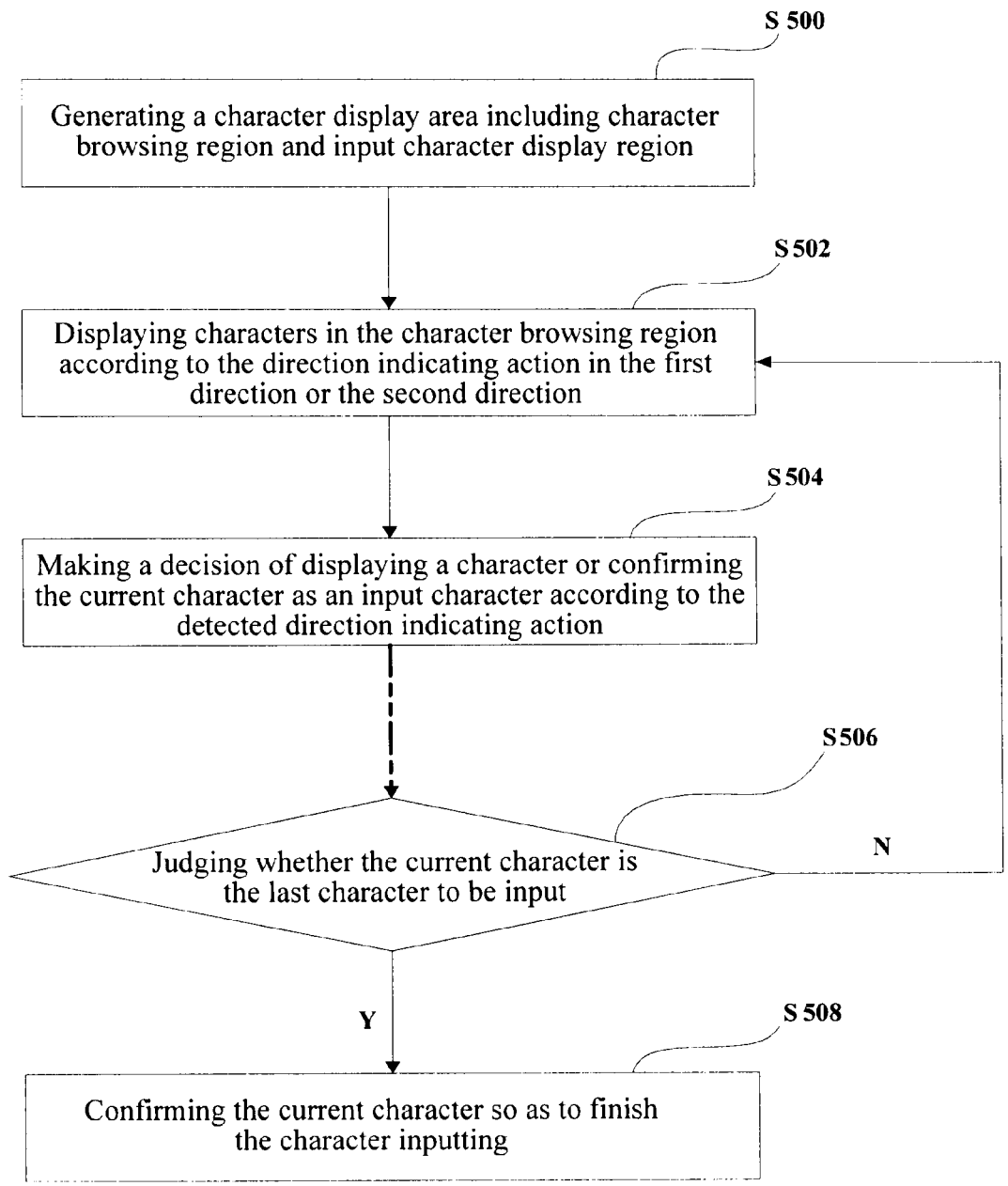
FIG. 5 is a schematic flow chart illustrating a method of inputting characters according to an embodiment of the invention.

In addition, an embodiment of the invention provides a method of inputting characters. FIG. 5 is a schematic flow chart illustrating the method of inputting characters according to the embodiment of the invention. The steps of the method are described in the following in conjunction with FIGS. 3 and 4. The first step executed is step S500.

In step S500, a character display area 300 is generated. In the embodiment, when the user initiates the character inputting function of the device 3 of inputting characters, the character display area 300 is generated on the display screen 30 according to the information of the initiation. The character display area 300 includes a character browsing region 301 and an input character display region 303, and the character browsing region 301 includes a first direction sub-region 301a and a second direction sub-region 301b. Then the step S502 is executed.

In step S502, characters are displayed in the first direction sub-region 301a or the second direction sub-region 301b of the character browsing region 301 according to a direction indicating action in a first direction or a second direction. In the embodiment, when inputting a character, the user may press the four-way control key 32 to perform the direction indicating action in the first direction or the second direction. The device of inputting characters may display the characters in the character information in a circularly scrolling manner in the first direction sub-region 301a or the second direction sub-region 301b, corresponding to the direction indicated by direction indicating action, of the character browsing region 301 according to the direction indicated by the detected direction indicating action (the "Up", "down" direction keys 320a correspond to the first direction and the "Right", "Left" direction keys 320b correspond to the second direction), so that the characters may be browsed by the user. Next the step S504 is executed.

In step S504, a decision of displaying a character or confirming the current character as an input character is made according to the detected direction indicating action. In the embodiment, when the direction indicating action of the four-way control key 32 is detected and the current direction indicating action indicates the first direction, a decision is make to enable the first direction sub-region 301a of the character browsing region 301 to display the candidate characters of the character information in a circularly scrolling manner. When a change in the directions indicated by two successive direction indicating actions performed by the four-way control key 32 is detected, if the former direction indicating action indicates the first direction and the latter direction indicating action indicates the second direction, a decision is made to confirm the current character displayed in the first direction sub-region 301a of the character browsing region 301 and make the current character to be displayed in the input character display region 303, then the current sub-region is switched from the first direction sub-region 301a to the second direction sub-region 301b according to the direction indicated by the latter direction indicating action, the second direction sub-region 301*b* is enabled to display the candidate characters of the character information in a circularly scrolling manner, and an action of selecting the next character corresponding to the second direction is performed. As can be seen, when there is a change in the directions indicated by two successive direction indicating actions, the latter direction indicating action has both the function of confirming the current character indicated by the previous direction indicating action so as to complete the inputting of the current character and the function of selecting the next character. Therefore, the operations, which needs two or more times of key pressing in the existing technologies, can be implemented by only one key-pressing action, the number of times of key pressing may be reduced, thereby increasing the efficiency of character inputting.

With the above described steps, the characters can be input rapidly. In addition, the more the number of the input characters is, the more significant the increasing in the character inputting efficiency of the method according to the embodiment of the invention will be, compared with the existing technologies.

In addition, the method of inputting characters may further include a confirming step S506 to confirm that all the characters have been input.

In step S506, it is judged whether the current character is the last character to be input. If yes, the step S508 is executed, otherwise, the processing returns to step S500 to continue the selection of the next character.

In step S508, the current character is confirmed so as to display the character as an input character in the input character display region 303, to complete the operation of character inputting. In the embodiment, at this time the input character display region 303 displays all the input characters and the character browsing region 301 returns to the initial status. The step of confirming may be implemented according to the existing technologies, and is not detailed herein.

Specifically, the method of inputting characters may further include a step of canceling one or more input characters currently displayed in the input character display region 303, and causing the character browsing region 301 to return to the initial state, so as to delete or modify the input characters.

In the case that the character information includes more than one character type, the method of inputting characters may further include a step of switching between character types. In the embodiment the character types include English character, Chinese character, digits, or special symbols, or the like.

FIGS. 6-10 illustrate some application examples of inputting characters of different character types according to the above method of inputting characters. The character types applied in the examples as shown in FIGS. 6, 7, 8, 9, and 10 are English character, digits, special symbols, and Chinese character (including a basic phonetic input mode or a fast phonetic input mode), respectively.

Figure 6:
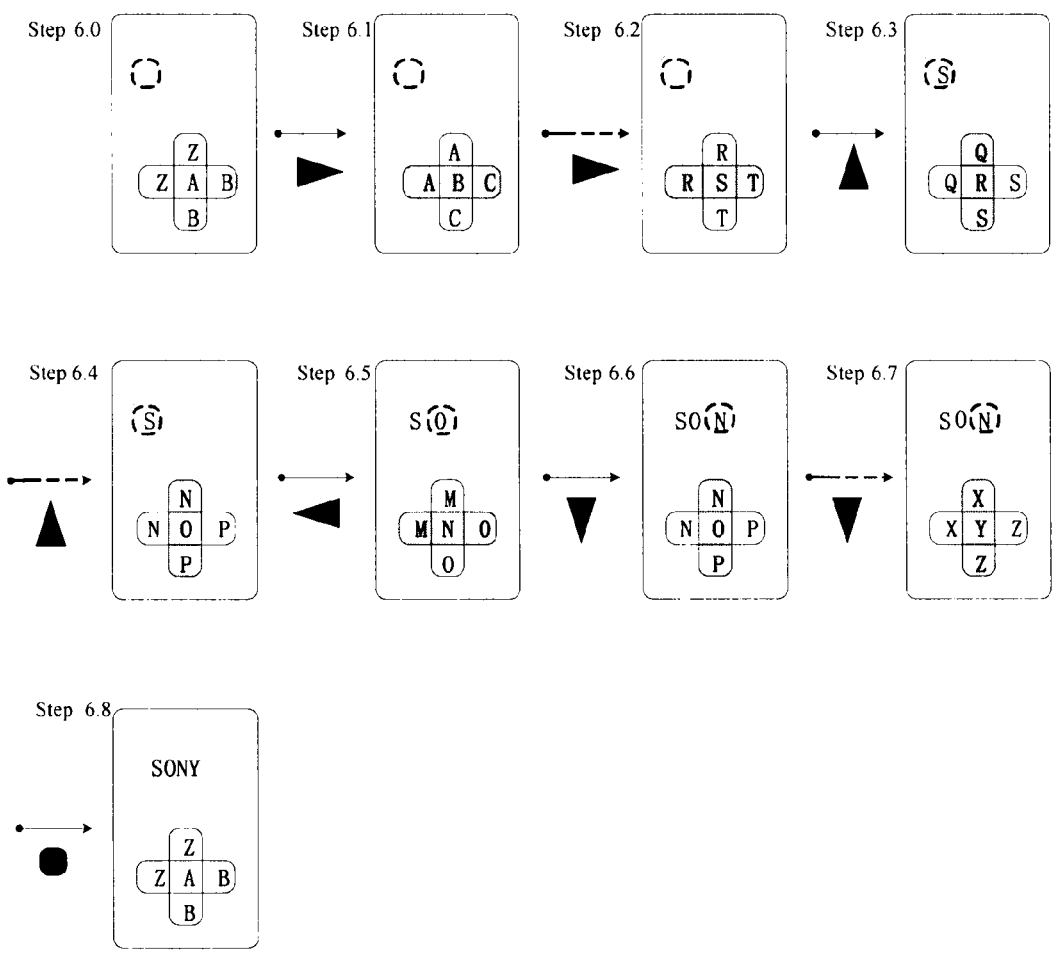
FIG. 6 illustrates an application example of inputting English letters in the method of inputting characters according to an embodiment of the invention.

In FIG. 6, an example of applying the method of inputting characters according to the embodiment to English character inputting is illustrated. As shown in FIG. 6 and in conjunction with FIG. 3, when the character type selected by a user is English character, the first direction sub-region 301*a* and the second direction sub-region 301*b* of the character browsing region 301 present the initial status of English letters, i.e. the current character displayed is the letter "A" (step 6.0). At this time the cursor is located at the position at which the first direction sub-region 301*a* and the second direction sub-region 301*b* of the character browsing region 301 intersect with each other. When the letters "SONY" are to be inputted, the "Right" key of the four-way control key 32 is pressed first, so the first direction sub-region 301*a* is highlighted and displays the letters in a circularly scrolling manner (step 6.1). It should be noted that the "Right" key is pressed as an example to illustrate the method, and the invention should not be regarded as limited to this. In practice, any direction key of the four-way control key 32 may be used to perform the function. In addition and specifically, the letters displayed in the second direction sub-region 301*b* may be kept synchronized with those displayed the first direction sub-region 301*a*, that is, the second direction sub-region 301*b* may display letters in a synchronized scrolling manner corresponding to the first direction sub-region 301*a*. In this way, the "Right" key is kept pressed until the current letter displayed in the first direction sub-region 301*a* becomes the letter "S" (step 6.2). At this time, the "Up" key is pressed (the "Down" key may be pressed alternatively. However, since the next character "O" precedes the character "S", it may save time to press the "Up" key). At this time the letter "S" is confirmed and displayed in the input character display region 303. On the other hand, since the pressed "Up" key indicates the second direction, the highlight which indicates the current action is switched from the first direction sub-region 301*a* to the second direction sub-region 301*b* corresponding to the second direction and the letters is displayed in a circularly scrolling manner (step 6.3). Compared with the "Right" key, the direction indicated by the "Up" key is different from that indicated by the "Right" key. The pressing of the "Up" key has both the function of confirming the inputting of the current character indicated by the previous pressing action and the function of selecting the next character according to the latter key-pressing action. The one key-pressing action may implement the operations which need two or more times of key pressing in the existing technologies. Similarly, the "Up" key is kept pressed until the current letter displayed becomes the letter "O" (step 6.4). The "Left" key is pressed so that the letter "O" is confirmed and displayed in the input character display region 303 and the selection of the letter "N" is started (step 6.5). The "Down" key is pressed so that the letter "N" is confirmed and displayed, and the selection of the letter "Y" is started (step 6.6). The "Down" key is kept pressed until the current letter displayed becomes the letter "Y" (step 6.7). Since the letter "Y" is the last one of "SONY", the confirming key 33 is pressed to confirm the letter "Y", thus the inputting of "SONY" is finished and the character browsing region 301 returns to the initial status (step 6.8). As can be seen, by changing the directions indicated by the four-way control key 32, the latter pressing action may has not only the basic function of direction indicating, but also the function of confirming the inputting of the current character displayed via the former pressing action. In this way, the number of times of key pressing may be reduced. The more the number of characters to be inputted is, the more significant the above effect is, thereby enhancing the character inputting efficiency. To input the characters "SONY", the inputting method by using virtual digit keys in the existing technologies needs 18 times of key pressing, while the method of inputting characters according to the embodiment needs only 5 times of key pressing. The number of times of key pressing is reduced significantly compared with the virtual digit keys and QWERTY virtual keypad. Accordingly, the character inputting efficiency may be improved. In addition, in the embodiment the English character is used as an example, however, the invention should not be considered as limited to this. The method of inputting characters may be applied to other character types, such as French character, Germany character, Italian character, Spain character, and the like.

Figure 7:
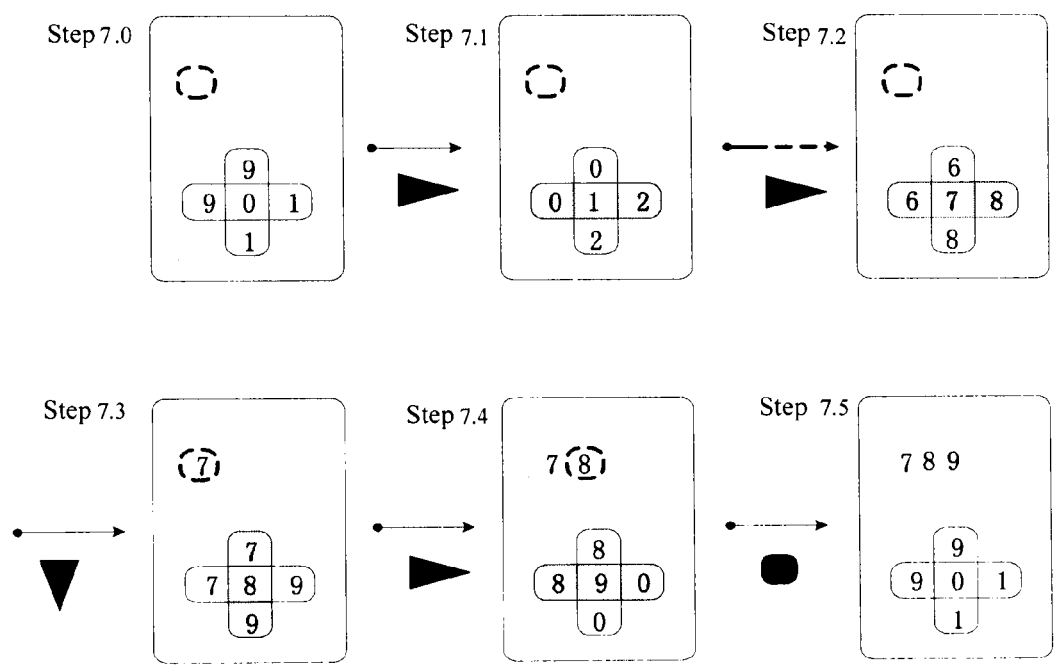
FIG. 7 illustrates an application example of inputting digits in the method of inputting characters according to an embodiment of the invention.
Figure 8:
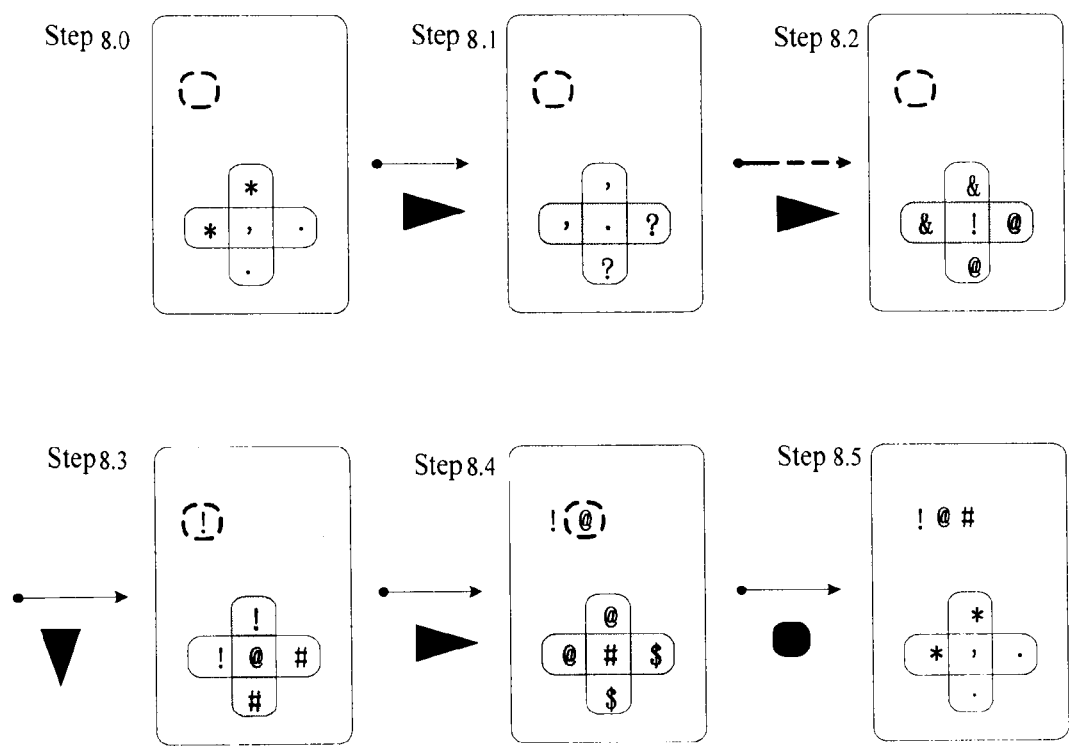
FIG. 8 illustrates an application example of inputting special symbols in the method of inputting characters according to an embodiment of the invention.

FIGS. 7 and 8 illustrate application examples of inputting digits and special symbols according to the method of inputting characters according to the embodiment of the invention, respectively. In FIG. 7, the character browsing region 301 is in its initial states in which the current character displayed is the digit "0" (step 7.0); while in FIG. 8 the character browsing region 301 is in its initial states in which the current character displayed is the special symbol "," (step 8.0). The method of inputting the characters of the two character types is the same as that of inputting the English character and is not repeated herein. Similarly, in two successive direction indicating actions of the four-way control key 32, the latter direction indicating action has the function of confirming the current inputting indicated by the former direction indicating action, thereby reducing the number of times of key pressing actions and enhancing the character inputting efficiency.

Figure 9:
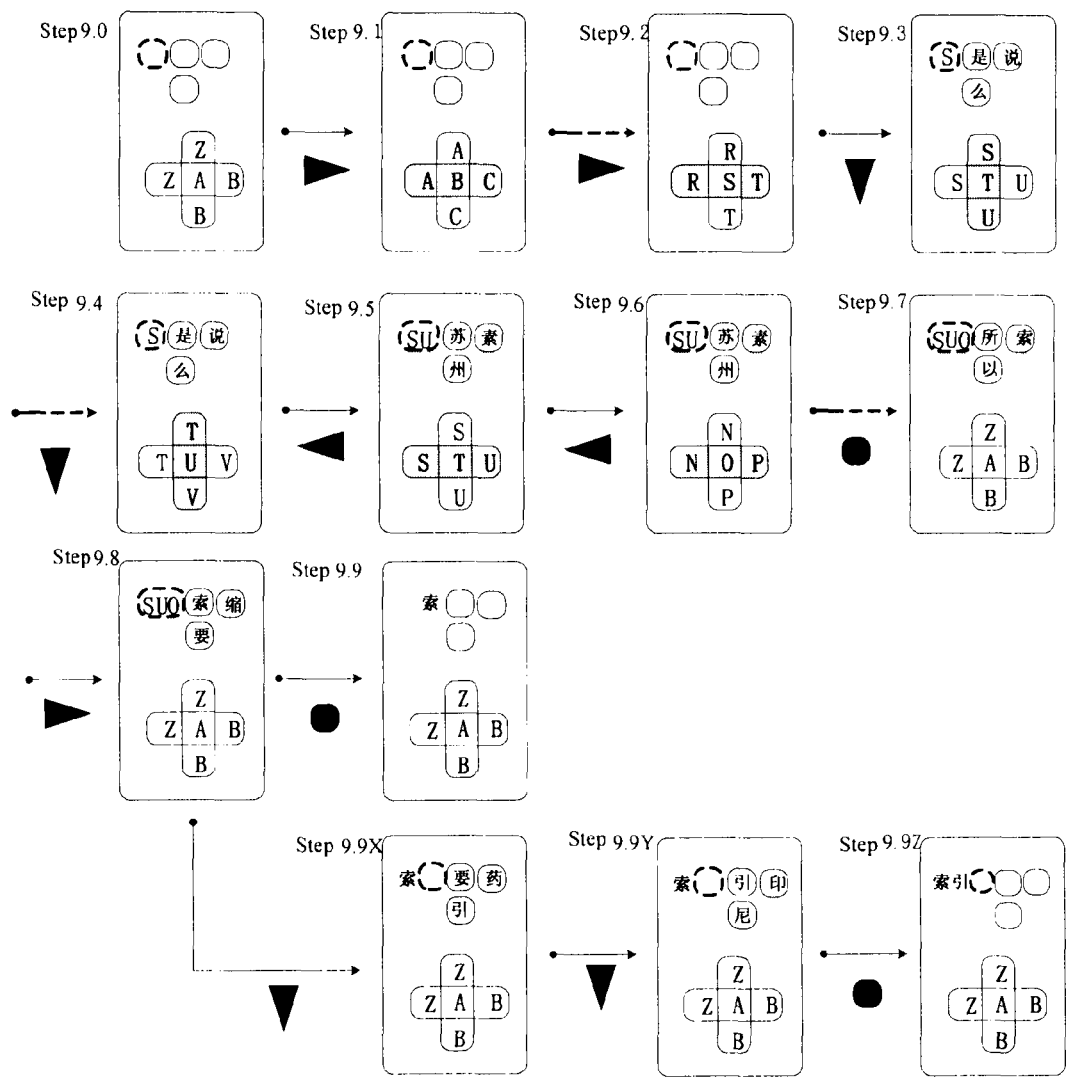
FIG. 9 illustrates an application example of inputting Chinese characters using the basic phonetic input mode in the method of inputting characters according to an embodiment of the invention.
Figure 10:
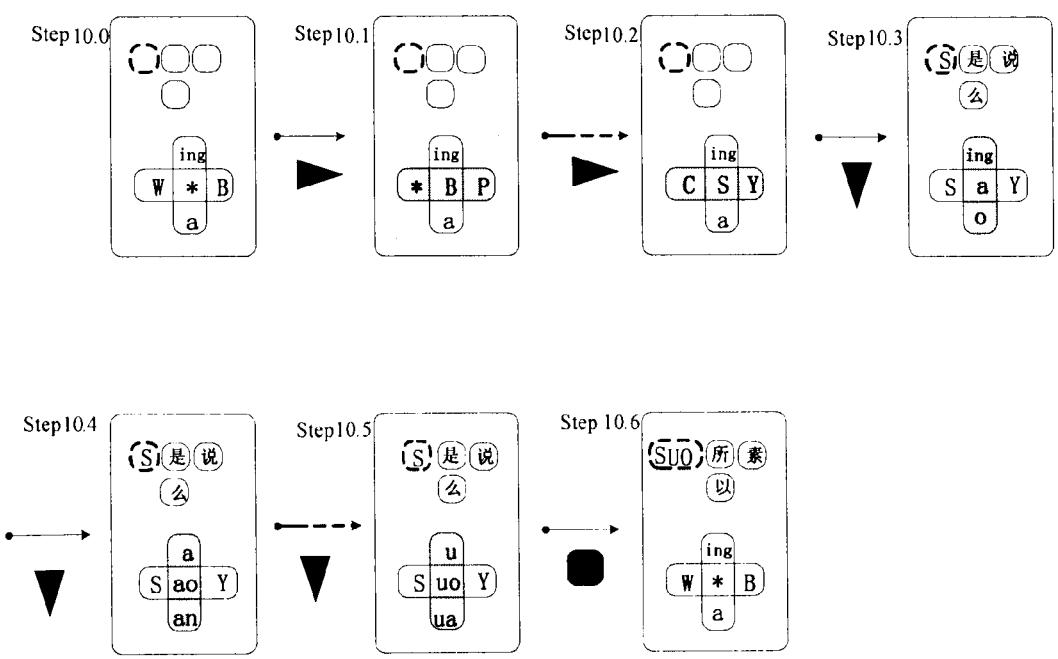
FIG. 10 illustrates an application example of inputting Chinese characters using the fast phonetic input mode in the method of inputting characters according to an embodiment of the invention.

FIGS. 9 and 10 illustrate application examples of inputting Chinese characters according to the method of inputting characters in an embodiment of the invention. FIG. 9 illustrates an example of using the basic phonetic input mode and FIG. 10 illustrates an example of using the fast phonetic input mode. When inputting the Chinese characters, the input character display region 303 includes a phonetic transcription/Chinese character inputting area 303a and a Chinese character selecting area 303b. Referring to FIG. 9, the inputting of the Chinese character "索" is used as an example. First under the initial status of the letters in the phonetic transcription (the character browsing region 301 displays the letter "A" as the current character), the phonetic transcription "SUO" of the Chinese character "索" is input by pressing the four-way control key 32, which is the same as the method of inputting "SONY" shown in FIG. 6. Finally the confirming key 33 is pressed to end the inputting of the letters in the phonetic transcription, the character browsing region 301 returns to the initial status and the phonetic transcription/Chinese character inputting area 303a displays the phonetic transcription "SUO". The difference lies in that, during the inputting of the letters in the phonetic transcription, the Chinese character selecting area 303b may display, according to the phonetic transcription in the phonetic transcription/Chinese character inputting area 303a, candidate Chinese characters corresponding to the currently input phonetic transcription in real time and candidate phrases corresponding to the candidate Chinese characters. When the phonetic transcription "SUO" has been input in the phonetic transcription/Chinese character inputting area 303a, the Chinese character selecting area 303b may extract, according to the phonetic transcription "SUO", a plurality of Chinese characters corresponding to the phonetic transcription "SUO" and display the plurality of Chinese characters so as to be selected by the user. The order of the plurality of Chinese characters may be adjusted according to their probabilities of being used by the user, so as to further improve the character inputting speed. In the above steps the confirming key 33 is pressed to confirm the letter "O", thus ending the inputting of "SUO". The input character display region 303 returns to the initial status and the cursor moves from the position at which the first direction sub-region 301a and the second direction sub-region 301b of the character browsing region 301 intersect with each other to the position at which the first Chinese character is displayed in the Chinese character selecting area 303b. Then by pressing the "Right" or "Left" key of the four-way control key 32, the cursor moves to "索", and then the confirming key 33 is pressed to confirm so that the Chinese character "索" is displayed in the phonetic transcription/Chinese character inputting area 303a. Further, if the user needs to input the phrase "索引", when the cursor has moved to the character "索", the direction indicated by the four-way control key 32 may be changed. That is, by pressing the Up or "Down" key, not only the character "索" is confirmed and displayed in the phonetic transcription/Chinese character inputting area 303a, but also the character "引" may be selected among the candidate phrases corresponding to the character "索" When the cursor moves to the character "引", the confirming key 33 is pressed to confirm the character. In this way, the phrase "索引" is input.

FIG. 10 illustrates an example of using the fast phonetic input mode. The difference between the fast phonetic input mode and the basic phonetic input mode lies in that, in the basic phonetic input mode the letters composing the phonetic transcription of each Chinese character needs to be input one by one, while in the fast phonetic input node the phonetic transcription of each Chinese character is divided into a first phonetic element and a second phonetic element. The first phonetic element includes for example the initial consonants (including b, p, m, f, d, t, n, l, g, k, h, q, x, zh, ch, sh, r, z, c, s, y, w, etc.) and the second phonetic element includes for example the vowels (including a, o, e, i, u, v, ai, ei, ui, ao, ou, iu, ie, ve, er, an, en, in, un, vn, ang, eng, ing, ong, etc. ). The first phonetic element corresponds to the first direction sub-region 301a of the character browsing region 301 and the second phonetic element corresponds to the second direction sub-region 301b of the character browsing region 301. Of course, the invention should not be regarded as limited to this. First, the corresponding relationship between the first and second phonetic elements and the direction regions may be replaced and modified. For example, the first phonetic element may correspond to the second direction sub-region 301b of the character browsing region 301 and the second phonetic element may correspond to the first direction sub-region 301a of the character browsing region 301. It should be noted, in the case that the phonetic transcription of some Chinese characters are composed of only vowels (for example, the phonetic transcription of the Chinese character "啊" is "a"), in the embodiment the first phonetic element(s) displayed in the first direction sub-region 301a of the character browsing region 301 may further include a blank symbol (e.g. "*") in addition to all the initial consonants. Again the inputting of the Chinese character "索" is used as an example. First under the initial status of the letters in the phonetic transcription (the character browsing region 301 displays the blank symbol "*" as the current character), the initial consonant "S" is selected in the first direction sub-region by pressing the "Right" or "Left" key of the four-way control key 32. When confirming the inputting the initial consonant "S", the direction of the pressed key is changed, i.e. the "Up" or "Down" key of the four-way control key 32 is pressed and the vowel "UO" is selected in the second direction sub-region 301b. Finally the confirming key 33 is pressed to confirm the inputting of the vowel "UO". In this way, the phonetic transcription "SUO" corresponding to the character "索" is displayed in the phonetic transcription/Chinese character inputting area 303a. At this time, the cursor has moved from the position at which the first direction sub-region 301a and the second direction sub-region 301b of the character browsing region 301 intersect with each other to the position at which the first Chinese character is displayed in the Chinese character selecting area 303b. Next, similar to the basic phonetic input mode, the character "索" is selected in the Chinese character selecting area 303b and confirmed, the steps of which are the same as those in the basic phonetic input mode and are not repeated herein. Compared with the basic phonetic input mode, the fast phonetic input mode may further reduce the number of times of key pressing and therefore further enhancing the character inputting efficiency.

Compared with the existing technologies, in the device and method of inputting characters according to the embodiments of the invention a character browsing region including a first direction sub-region and a second direction sub-region is provided. When detecting a change in the directions indicated by two successive direction indicating actions, the latter direction indicating action has the function of confirming the current character indicated by the previous direction indicating action so as to complete the inputting of the current character. Further, the direction indicated by the latter direction indicating action may also be used to select the next character in the following step. The latter direction indicating action may perform part of the functions of the confirming action in the existing technologies. In this way, the operations, which may need two or more pressing actions in the existing solutions, can be completed by one key-pressing action which indicates direction change. Accordingly, the number of times of key pressing is reduced and the efficiency of character inputting is increased.

In addition, with the above described embodiments, the reduction in the number of times of key pressing can further alleviate the structural damage to the keys, thereby lengthening the life of the keys.

Furthermore, the advantages of the above described embodiments further include the alleviation of the operation fatigue of a user that may result from frequent key-pressing actions, thereby enhancing the comfort in operation.

Moreover, in the embodiments of the invention, by providing the character browsing region including the first direction sub-region and the second direction sub-region, the device of inputting characters may be used to input characters more rapidly and more conveniently. In addition the interface appears trim and clean visually.

A person of ordinary skill in the art can appreciate that all of or a part of the steps in the above methods according to the embodiments may be implemented by program instructing related hardware. The program may be stored in the readable storage medium of a computer. The storage medium may include, for example, ROM/RAM, magnetic disc, optical disc, and the like.

While some embodiments are described above, the embodiments should not be regarded as a limitation to the invention. It will be appreciated that a person of ordinary skill in the art can recognize many variations or modifications without departing from the spirit and scope of the invention. Therefore, the protection scope of the invention should be defined by the following claims.

What is claimed is:

1. A character inputting device comprising:
a display unit; and
circuitry configured to
receive an input for selecting a current character;
perform direction indicating actions in a first direction and in a second direction to change the current character selected into a character candidate; and
generate a character display area through the display unit, the character display area including an input display region and a character browsing region, the character browsing region including a first direction sub-region corresponding to a first direction indicating action and a second direction sub-region corresponding to a second direction indicating action, and the first direction sub-region for displaying character candidates in response to the first direction indicating action and the second direction sub-region for displaying character candidates in response to the second direction indicating action, wherein
the character browsing region is highlighted in the first direction sub-region according to the first direction indicating action,
the character browsing region is highlighted in the second direction sub-region according to the second direction indicating action,
in the character browsing region, the character candidates surround the current character selected and vary according to the current character selected,
a size of a display area displaying the current character selected is substantially the same as that of the first direction sub-region and the second direction sub-region, and
when two successive direction indicating actions indicate different directions, the second of the two successive direction indicating actions both confirms the current character indicated by the first of the two successive direction indicating actions to complete the input of the current character and selects a next character after the current character.

2. The device according to claim 1, wherein the circuitry is further configured to display the character candidates surrounding the current character selected in any of four directions, including up, down, left, and right, of the current character selected.

3. The device according to claim 1, wherein the circuitry is further configured to generate the character display area to include a candidate word display region that displays changing candidate words or phrases according to the character candidate selected.

4. The device according to claim 1, wherein the circuitry is further configured to
switch between character types, and
control the display unit to display characters of a switched type.

5. The device according to claim 1, wherein the device is a cell phone, a video and audio player, or a hand held game machine.

6. The device according to claim 1, wherein the circuitry is further configured to control the display unit to display characters that are input and confirmed.

7. The device according to claim 1, wherein the circuitry is further configured to receive the input of characters one-by-one.

8. The device according to claim 1, wherein the circuitry is further configured to generate the character display area such that the character browsing region returns to an initial state when one or more input characters are canceled.

9. The character inputting device according to claim 1, wherein
character candidates displayed in the first direction sub-region are synchronized with character candidates displayed in the second direction sub-region, and
character candidates displayed in the second direction sub-region are synchronized with character candidates displayed in the first direction sub-region.

10. The character inputting device according to claim 1, wherein the circuitry is further configured to generate the character display area so that the first direction sub-region is perpendicular to the second direction sub-region and the first direction sub-region overlaps with the second-direction sub-region in a candidate word display region that displays the current character selected.

11. A non-transitory computer readable medium storing instructions which when executed cause a computer to perform a process, the process comprising:
   receiving an input for selecting a current character;
   performing direction indicating actions in a first direction and in a second direction to change the current character selected into a character candidate; and
   generating a character display area, the character display area including an input display region and a character browsing region, the character browsing region including a first direction sub-region corresponding to a first direction indicating action and a second direction sub-region corresponding to a second direction indicating action, and the first direction sub-region for displaying character candidates in response to the first direction indicating action and the second direction sub-region for displaying character candidates in response to the second direction indicating action, wherein
   the character browsing region is highlighted in the first direction sub-region according to the first direction indicating action,
   the character browsing region is highlighted in the second direction sub-region according to the second direction indicating action,
   in the character browsing region, the character candidates surround the current character selected and vary according to the current character selected,
   a size of a display area displaying the current character selected is substantially the same as that of the first direction sub-region and the second direction sub-region, and
   when two successive direction indicating actions indicate different directions, the second of the two successive direction indicating actions both confirms the current character indicated by the first of the two successive direction indicating actions to complete the input of the current character and selects a next character after the current character.

12. The non-transitory computer readable medium according to claim 11, wherein the process further comprises displaying the character candidates surrounding the current character selected in any of four directions, including up, down, left, and right, of the current character selected.

13. The non-transitory computer readable medium according to claim 11, wherein the process further comprises displaying a candidate word display region displaying changing candidate words or phrases according to the character candidate selected in the character display area.

14. The non-transitory computer readable medium according to claim 11, wherein the process further comprises:
   switching between character types; and
   displaying characters of a switched type.

15. The non-transitory computer readable medium according to claim 11, wherein the process performed by a cell phone, a video and audio player, or a hand held game machine.

16. The non-transitory computer readable medium according to claim 11, wherein the process further comprises displaying characters that are input and confirmed in the input character display region.

17. The non-transitory computer readable medium according to claim 11, wherein the process further comprises receiving an input of characters one-by-one.

18. The non-transitory computer readable medium according to claim 11, wherein the process further comprises returning the character browsing region to an initial state when one or more input characters are cancelled.

19. The device according to claim 3, wherein the circuitry is further configured to adjust an order of the candidate words or phrases according to a probability of being selected by a user.

20. The non-transitory computer readable medium according to claim 13, wherein the process further comprises adjusting an order of the candidate words or phrases according to a probability of being selected by a user.

* * * * *